(12) United States Patent
Noble (10) Patent No.: US 7,043,011 B1
(45) Date of Patent: May 9, 2006

(54) LONG DISTANCE TELEPHONIC ACCESS ASSEMBLY AND METHOD FOR CONDUCTING TELEPHONIC TRANSACTIONS

(75) Inventor: Thomas A. Noble, West Des Moines, IA (US)

(73) Assignee: Noble, Inc., West Des Moines, IA (US)

( * ) Notice: Subject to any disclaimer, the term of this patent is extended or adjusted under 35 U.S.C. 154(b) by 13 days.

(21) Appl. No.: 10/912,830

(22) Filed: Aug. 6, 2004

(51) Int. Cl.
*H04M 1/00* (2006.01)

(52) U.S. Cl. .......................... 379/355.03; 379/355.01; 379/357.03

(58) Field of Classification Search ........... 379/355.01, 379/355.03, 357.03

See application file for complete search history.

(56) References Cited

U.S. PATENT DOCUMENTS

| | | | |
|---|---|---|---|
| 5,343,519 A * | 8/1994 | Feldman | 379/357.03 |
| 5,353,017 A * | 10/1994 | Suzuki et al. | 455/348 |
| 5,764,742 A | 6/1998 | Howard et al. | |
| 5,963,637 A | 10/1999 | Arzoumanian | |
| 6,028,926 A * | 2/2000 | Henderson et al. | 379/357.03 |
| RE37,660 E * | 4/2002 | Talton | 379/355.05 |
| 6,579,728 B1 * | 6/2003 | Grant et al. | 438/3 |

* cited by examiner

*Primary Examiner*—Jefferey F. Harold
(74) *Attorney, Agent, or Firm*—G. Brian Pingel; Camille L. Urban; Adam W. Jones (57) ABSTRACT

A portable electronic long distance telephonic access assembly that includes an automatic dialing device for producing a long distance telephone number and a personal identification number and a carrier with machine readable data corresponding to the personal identification number for use in activating the number with a long distance telephone service provider.

17 Claims, 6 Drawing Sheets

LONG DISTANCE TELEPHONIC ACCESS ASSEMBLY AND METHOD FOR CONDUCTING TELEPHONIC TRANSACTIONS

BACKGROUND OF THE INVENTION

1. Field of the Invention

The present invention relates in general to an automatic dialing assembly that serves as an alternative for a prepaid phone card and more specifically to such an assembly that includes a personal identification number in machine readable data for reading by a point of sale terminal for activation purposes.

2. Description of the Prior Art

Prepaid calling cards are rapidly becoming more and more popular. In 1999, thirty-three percent of United States consumers were using prepaid phone cards. Just four years later in 2003 it is estimated that an excess of sixty percent of U.S. consumers used prepaid phone services. Prepaid phone card sales are estimated to have exceeded 4 billion dollars in 2003. Sixty-two percent of all teenagers 12 to 17 years report prepaid card usage while fifty-four percent of young adults between 18 and 34 also are active phone card users. Older users have shown the greatest growth in card usage, increasing from eleven percent in 1999 to thirty-five percent in 2001. One-third of all card users purchase a prepaid phone card at least once a month. In 2002, the average convenience store sold over $10,000 worth of prepaid phone services compared to only $3,421 in 2001.

The major reason mainstream customers use prepaid phone cards is for convenience and to save money. Two out of five prepaid customers say they purchase cards to save money on telephone calls. One out of five say they use prepaid cards because they are convenient. Avoiding long distance calls on telephone bills is also a common reason for usage.

A typical prepaid calling card includes two multi-digit numbers printed thereon corresponding to a toll free telephone number to access a central accounting system and a personal identification number (PIN) that is specific to each card. For each PIN, an account is established for a predetermined amount of long distance telephone service. Thus, simply by dialing the toll free access number for the central accounting system and then dialing the PIN, a prepaid calling card user obtains access to a long distance telephone system for the placement of calls as desired.

Prepaid calling card accounts are normally maintained by long distance telephone service providers or resellers who buy long distance telephone time in bulk and then resell such time to consumers. In view of the fact that the only information needed to access a person's account is the toll free access number and the PIN, security is often a major problem. Accordingly, different alternatives for protecting the PIN or the toll free calling card number have been utilized, for example, one or both of these numbers may be encoded in machine readable data included on the calling card.

One of the biggest problems with prepaid calling cards is the frustration and error frequency that users encounter in attempting to manually dial the 22 to 30 digits encompassing the toll free access number and the PIN. Obviously, simply the misdialing of one number of these 22 to 30 digits requires a user to repeat the dialing operation to successfully place a call.

In view of the above concerns, a variety of prior art devices have been developed to provide a means for automatically dialing at least a portion of the numbers required to be dialed for obtaining access to the central switching network. For example, in U.S. Pat. No. 5,764,742 issued to Howard, et al. in 1998, a telephone access system is disclosed that provides a portable device having a magnetic card reader for reading optically encoded data on a prepaid calling card and a tone generator for generating one or both of a toll free telephone number and an access code to a long distance telephone service. As described in such patent, the reader is utilized for reading the optically encoded data on the calling card and is then capable of generating the toll free number and/or the access code upon actuation.

Another example of a prior art device is disclosed in U.S. Pat. No. 5,963,637 issued to Arzoumanian Oct. 5, 1999. Such patent discloses a portable telephone dialing device that is adapted to automatically dial a preprogrammed abbreviated telephone number at one speed, waiting for a short period and then dialing a preprogrammed access number at a different speed for gaining access to a long distance telephone system.

Although the above described prior art devices have useful functions and features that eliminate to a certain extent certain of the concerns provided by standard prepaid telephone calling cards, neither of such devices is adapted to be activated through a point of sale operation and they are unnecessarily complicated in structure and operation. The present invention is designed to provide an automatic telephone dialer that allows for activation of a personal identification number account at a point of sale terminal and the automatic dialing upon actuation of a toll free access number and a PIN for gaining authorization to a central telephone system.

SUMMARY OF THE INVENTION

The present invention provides a portable electronic long distance telephonic access assembly that includes an automatic dialing device for producing a long distance telephone number and a personal identification number (PIN), means for actuating the dialing device and carrier means having machine readable data corresponding to said PIN for use in activating the number with a long distance telephone service provider.

Preferably, the automatic dialing device is enclosed in a thin rectangularly shaped housing and said actuation means is in the form of a push button that causes the dialing device to produce the long distance telephone number and the PIN when depressed.

The automatic dialing device is formed of a computer processing means that controls the operation of the dialing device, memory means for storing the long distance telephone number and said PIN, means for generating electronic signals corresponding to said telephone number and the PIN and transducer means for receiving signals from said generating means and producing said audible tone. The generating means is adapted to produce dual tone modulated frequency signals corresponding to said long distance number and said PIN and preferably, there is a time delay between the long distance number and the PIN in the range of two to ten seconds.

Preferably, the carrier means is formed in two parts each having machine readable data corresponding to the PIN and includes a first card that is of a size similar to that of a conventional credit card and a second card that is smaller than the first card. The back of the dialing device includes a "U" shaped retaining rail that is formed to receive the smaller card in a storage position so that the dialing device and second card are conveniently retained together.

The method of the present invention is adapted to provide access to a telephonic communication service that requires a point of sale activation involving a PIN. The method includes the steps of providing a portable electronic long distance telephone access assembly for automatically dialing a long distance telephone number and a PIN, providing a carrier means having machine readable data corresponding to the PIN, providing a credit card terminal reader adapted for point of sale activation for prepaid credit cards, and passing said carrier means through said terminal reader for activation of an account corresponding to the PIN of the telephone access assembly. Additionally, the method of the present invention involves the recharging of the amount of long distance telephone service initially provided by said calling card either by telephone or by a retailer.

The foregoing and other advantages of the present invention will appear from the following description. In the description, reference is made to the accompanying drawings which form a part hereof, and which are shown by illustration and not of limitation a specific form in which the invention may be embodied. Such embodiment does not represent the full scope of the invention, but rather the invention may be employed in a variety of other embodiments and reference should be made to the claims herein for interpreting the breadth of the invention.

DETAILED DESCRIPTION OF THE PREFERRED EMBODIMENT

Figure 1:
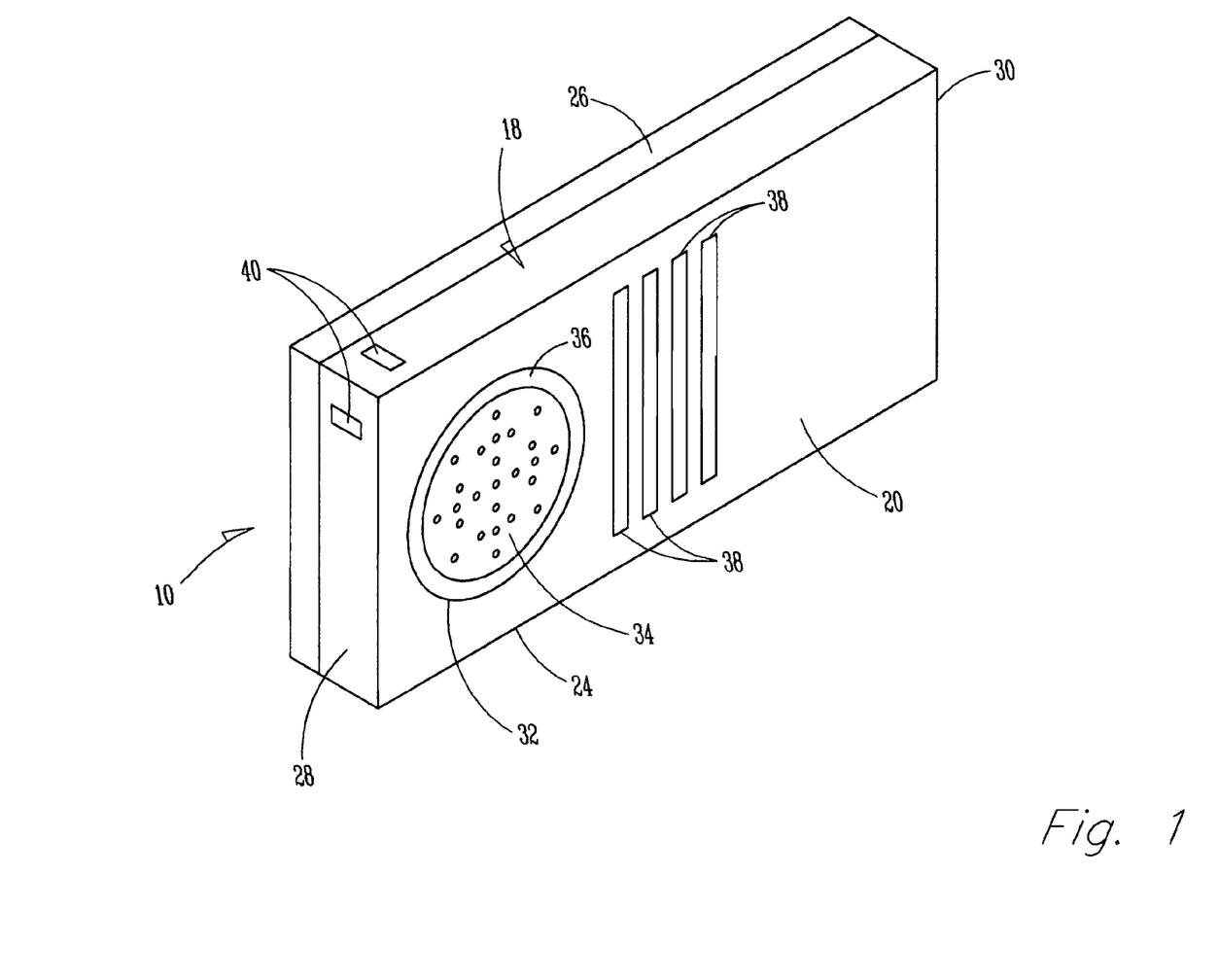
FIG. 1 is a front perspective view of an automatic dialing device that is employed in the preferred embodiment of a portable electronic long distance telephonic access assembly of the present invention.
Figure 6:
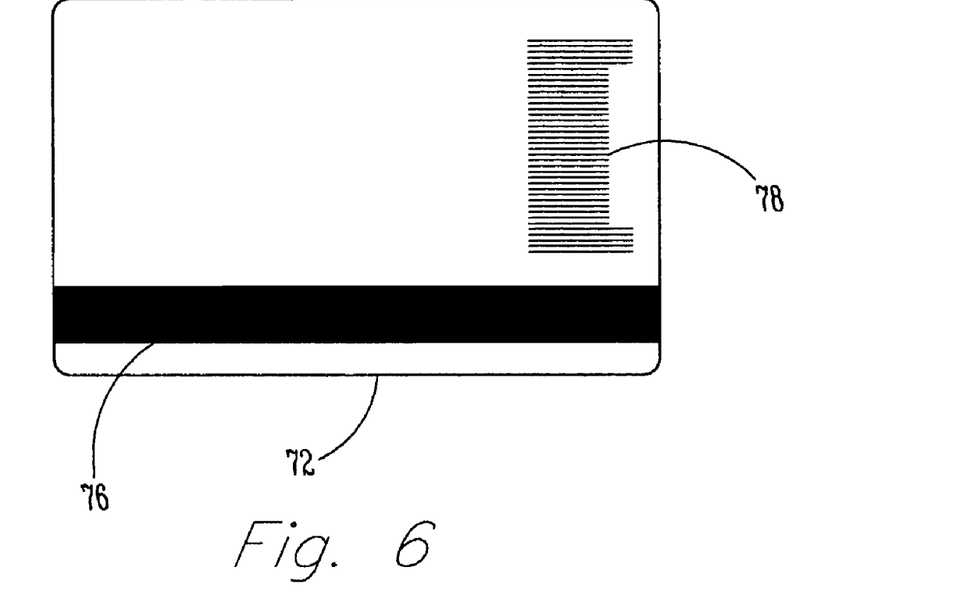
FIG. 6 is a plan view of a large card member that is included in the preferred embodiment of the telephonic access assembly of the present invention.
Figure 7:
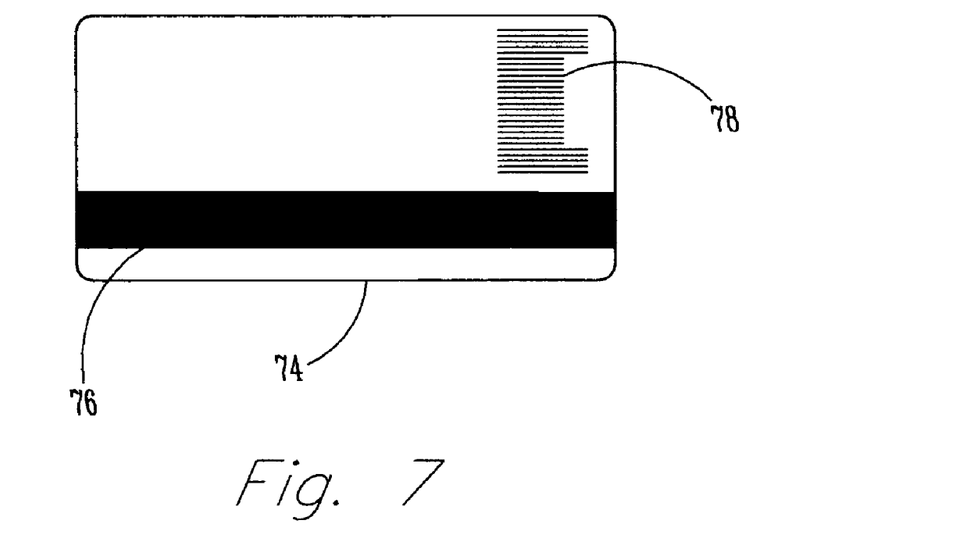
FIG. 7 is a plan view of a small card member that is included in the preferred embodiment of the telephonic access assembly of the present invention.

Referring now to the drawings and with reference first to FIG. 1, an automatic dialing device is shown at 10 and is employed in a preferred embodiment of a portable electronic long distance telephonic access assembly 12 that is comprised of the dialing device 10 and a machine readable data means that serves as a data carrier 14 preferably in the form shown in FIGS. 6 and 7. The dialing device 10 is adapted to be utilized as alternative for a conventional prepaid calling cards, the use of which has become highly popular not only in the United States but throughout the world.

Conventional prepaid calling cards are utilized to access telephone service systems comprising networks of long distance communication that allows one to be able to make telephone calls throughout the United States and the rest of the world. To obtain access to a particular telephone service system typically a calling card user must dial a toll free, 800 or 888 access number to be connected to a central station of the service system. Central stations may be operated by a communication's carrier, but the current trend is for such stations to be operated by resellers who buy long distance telephone time in bulk from the system carrier for resale to consumers. Located at the central station is the necessary switching equipment for receiving incoming calls and routing them onto the telephone service system.

Once a calling card user initiates contact with the central station, the user must provide identification to the station to verify that he is a lawful user. Thus, the central station maintains individual accounts that are dedicated to each prepaid calling card and such accounts each have an associated authorization code or as is more typical, a personal identification number (PIN). Also included in the central station is high speed data processing equipment that keeps track of the various phone calls passing through the central station, their duration, cost and the account to which they should be debited. Conventional prepaid calling cards, therefore, must list not only the toll free telephone number of the central station, but must also include a PIN that is associated with that particular card.

Although prepaid calling cards are dramatically increasing in usage, they are often frustrating to use as they require not only the dialing of the eleven digit toll free access number and the PIN which may be anywhere from nine to sixteen digits in length. Frequently, the dialing of this many digits is an exercise in frustration because all that is required is one mistake in dialing and the entire process will have to be reinitiated. This is particularly true if the mistake occurs near the end of the dialing process.

The automatic dialing device 10 is adapted to eliminate the dialing frustrations presented by a conventional credit card by providing, upon actuation, a first series of tones representing a toll free telephone number of a central station for a long distance telephone service provider and following a short delay, a second series of tones representing a personal identification number (PIN) associated with such device. Thus, the central station can be reached without the user manually dialing a single number.

As shown in FIGS. 1–4, the dialing device 10 includes a housing 18 that has a thin rectangularly shaped configuration that can easily fit into the palm of one's hand. The housing 18 is formed with a front planar surface 20 and a back surface 22 that is generally planar and has generally flat sidewalls 24 and 26 and a top end wall 28 and a bottom end wall 30.

Figure 2:
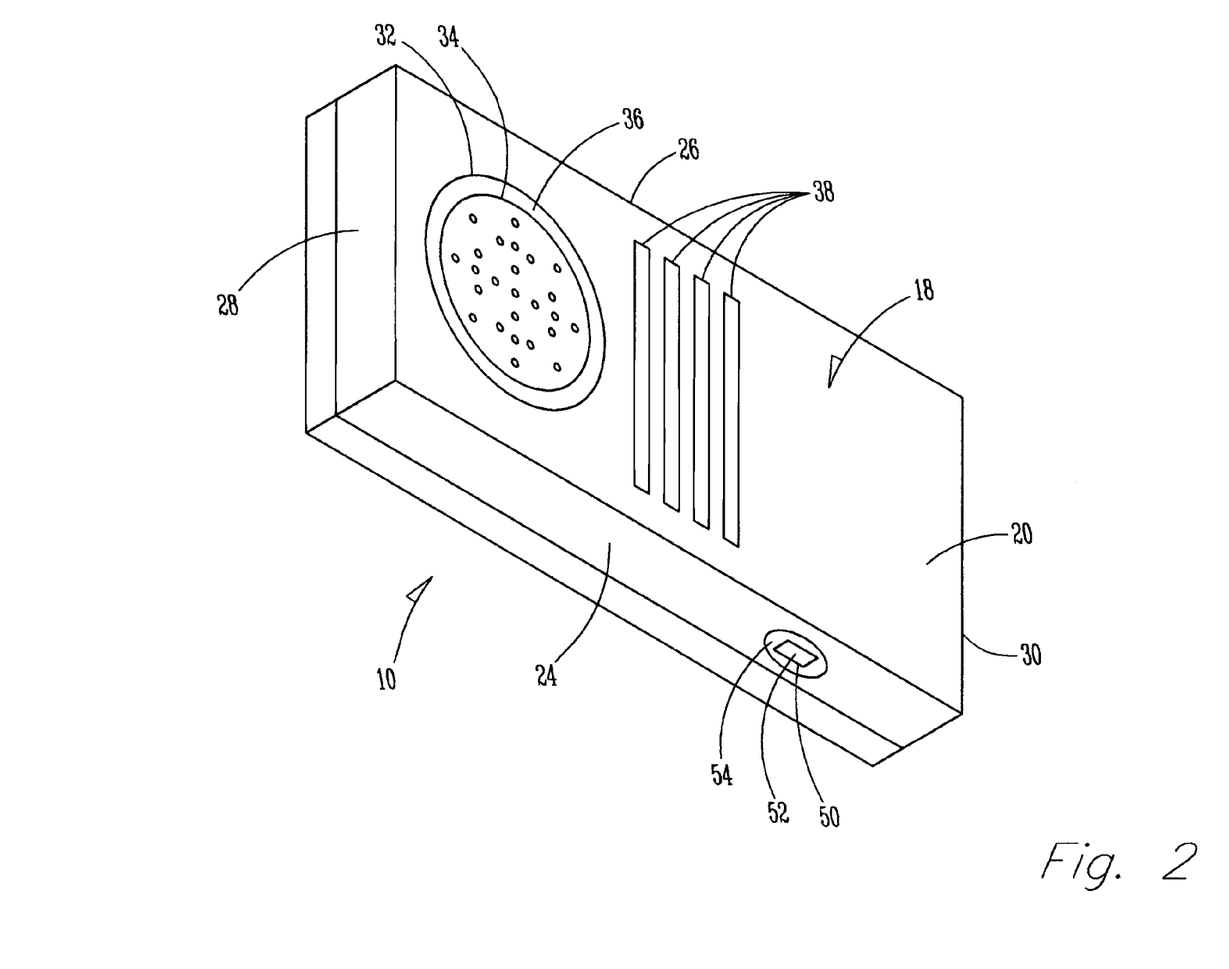
FIG. 2 is a different front perspective view of the dialing device shown in FIG. 1.

The front wall 18 includes an aperture 32 for receiving a speaker 34 that is surrounded in the wall 18 with a spherical cushion 36. Additionally, four transverse, parallel aligned air vents 38 to assist in allowing free air flow to the interior of the housing 18. Preferably, near the ends of the sidewall 26 and top wall 28 are openings 40 by which a key ring may be attached to the housing 18.

Figure 3:
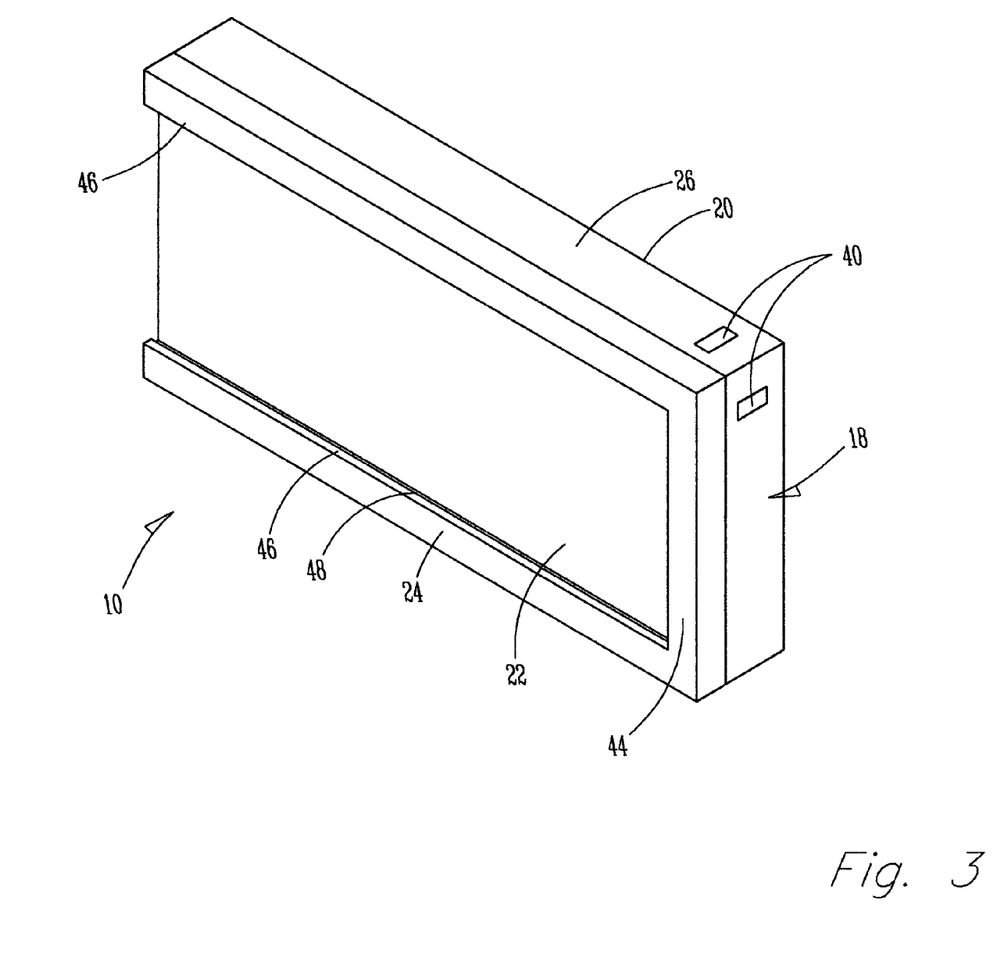
FIG. 3 is a rear perspective view of an automatic dialing device that forms a part of the preferred embodiment of the telephone access assembly of the present invention.
Figure 4:
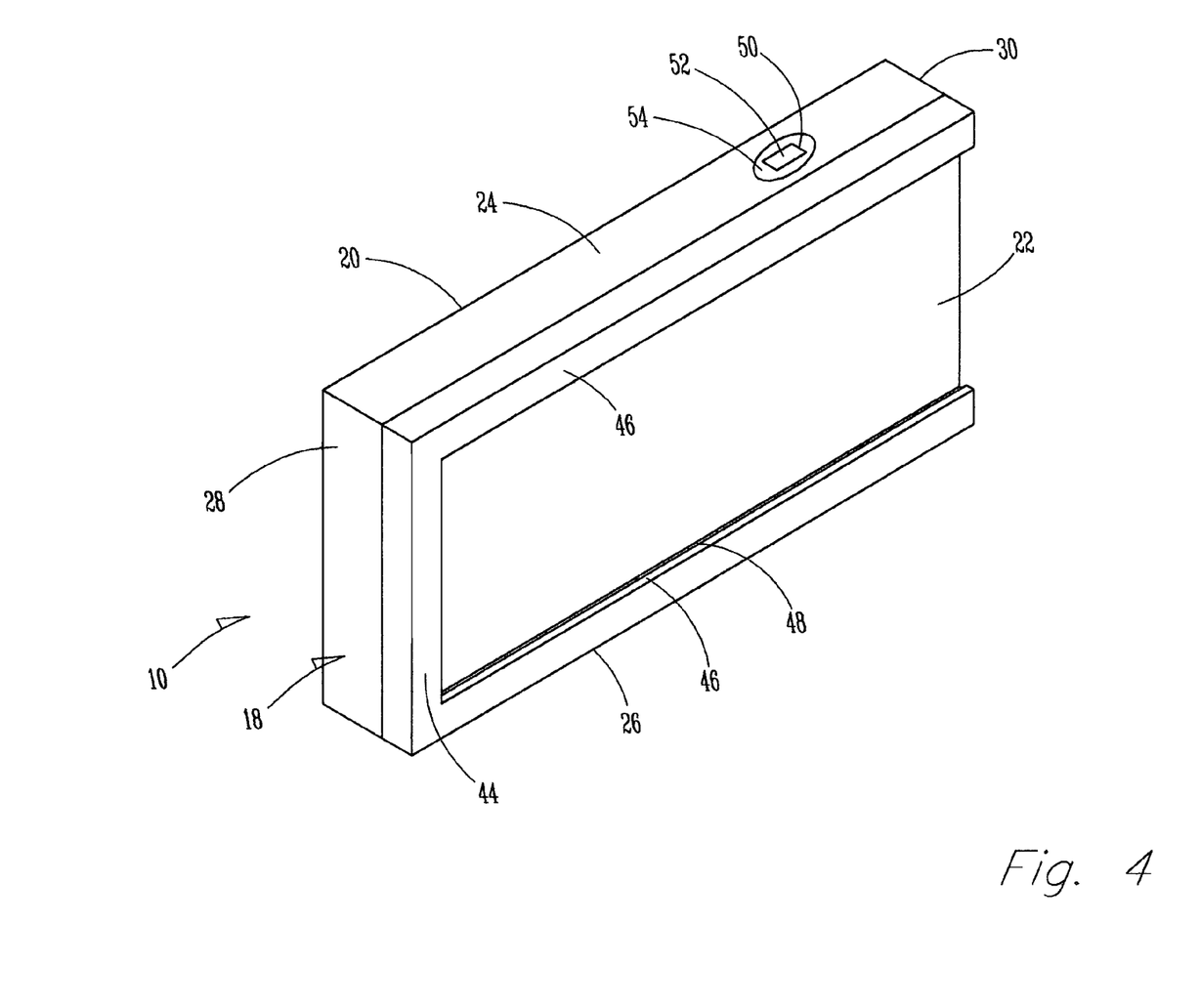
FIG. 4 is a different rear perspective view of the dialing device as shown in FIG. 3.

The back surface 22 of the device 10 includes a generally "U" shaped retaining rail 44 about the periphery of the sides 24 and 26 and the top end wall 28 as best shown in FIGS. 3 and 4. The rail 44 has an upper flange 46 spaced apart from the back surface 22 to provide recessed portions 48 for a purpose as will be described below. Preferably, the housing sidewall 24 has a small opening 50 through which an activation push-button 52 protrudes. For protection of the button 52, there is a generally spherical indentation 54 in the housing sidewall 24 surrounding the button 52 so that it does not extend beyond the planar surface of the side 24.

Figure 5:
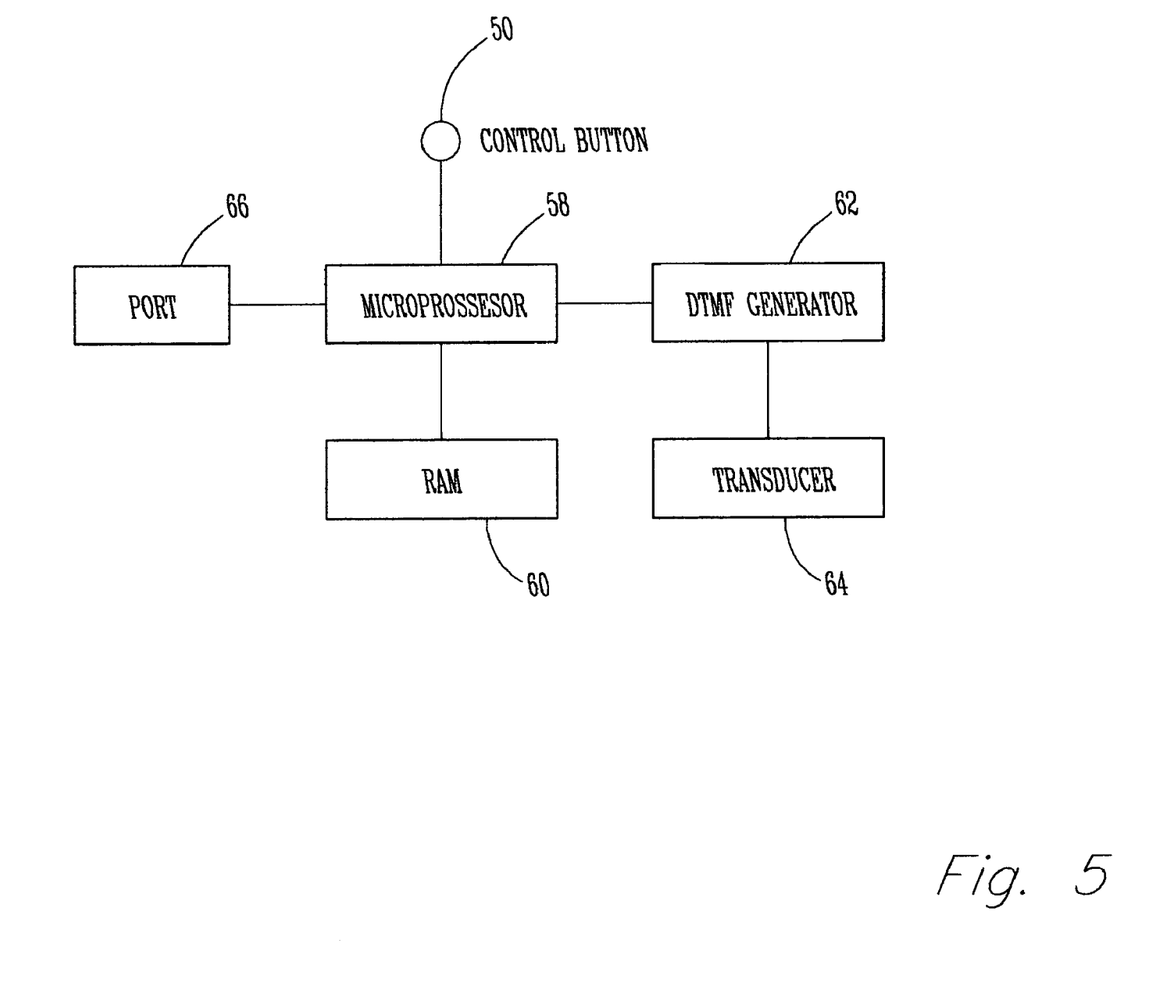
FIG. 5 is a block diagram showing the electronic components included in the dialing device of FIG. 1.

The housing 18 serves as an enclosure for the electronic components of the dialing device 10, which preferably encompass the components illustrated in the functional block diagram of FIG. 5. Included in such components is a microprocessor 58, a random access (RAM) memory 60 with a thirty-six digit storage, a dual tone modulated frequency generator 62 and a transducer/speaker 64. If desired, such components may also include an internal port 66 for providing additional data to the RAM 60.

The operation of the dialing device 10 is controlled by the microprocessor 58. Preferably, the toll free telephone number and the PIN are preprogrammed into the memory of the RAM 60. Upon actuation of the push button 52, such telephone number and PIN are retrieved and appropriate control signals are sent to the tone generator 62. In response, DTMF tone signals are generated corresponding to the telephone number and PIN and are provided to the transducer/speaker 64.

As will be recognized by those skilled in the art, the first number produced by the generator 62 is the toll free access telephone calling number for the central station of the telephone service provider and the second number is the PIN. An appropriate delay time of approximately 2–10 seconds but preferably around 6.3 seconds is programmed by the microprocessor 58 to provide sufficient time for the call to be received by the central station and a prompt request for submission of the PIN to be made. Consequently, simply by the action of pressing the push button 52 one time produces the automatic dialing by the device 10 of the toll free number and the PIN to provide a user access to the switching equipment located at the central station, at which time the user can then manually dial the telephone number desired to be reached.

It is contemplated that the access assembly 12 will be sold at a wide variety of retail outlets and the dialing device 10 and the carrier means 14 will be packaged together in a single unitary package. Preferably, the carrier means 14 comprises a large card member 72, as shown in FIG. 6, that is of a conventional credit card size, and a small card member 74, as shown in FIG. 7.

Each of the card members 72 and 74 preferably includes a magnetic stripe 76 and/or a UPC code 78 on which a PIN specifically associated with a particular one of the access assemblies 12 is encoded. Accordingly, for those retailers that have credit card terminal readers, the selling agent merely has to remove one of the card members 72 or 74 from the packaging and then swipe such card member through the terminal reader to activate the dialing device 10. The device's inputted PIN is then electronically forwarded by modem to a terminal gateway for activation.

Preferably, at least one or both of the card members 72 and 74 may contain the UPC code 78 or a radio frequency identification device (RFID) containing the PIN so that the device 10 may also be activated simply by scanning such code or RFID. Alternatively, the device 10 may be placed on any telephone handset and by dialing a toll free location, the selling retailer may then activate the device 10 to transmit the PIN to an interactive voice response (IVR) provider. At a predetermined prompt, the selling agent activates the device 10 so that the PIN is transmitted. The dollar amount of the retail sale is entered into the system by use of the telephone's numeric keypad, followed by the last four digits of the selling clerk's social security number. The selling retailer is identified by the IVR provider using automatic number identification (ANI) based upon the retailer's area code and phone number so that the retailer is recognized by the IVR as an authorized seller of the access assembly 12.

For convenience, the card member 74 is of a size so that it will be received in the recessed portions 48 on the housing back surface 22 for storage purposes. Preferably the recessed portions 48 are reduced in size near the top end of the housing 18 to secure the card member 74 in a friction fit therein.

As a result, the present invention not only provides an apparatus for conveniently and efficiently making prepaid credit card calls, but also allows for a speedy and efficient method of obtaining point of sale account activation by a retailer at the time of purchase. Furthermore, in addition to such advantages, the access assembly of the present invention also is highly adapted for being used for recharging the amount of long distance telephone service originally covered by the assembly 12 at the time of purchase.

Recharging can readily be accomplished by the user simply through the process of calling a separate access number included on one or both of the card members 72 and 74. Such number is specifically established by the telephone service provider and provides access to an IVR system similar to that described above. During such telephone call the IVR provides the specific prompts to determine the amount of additional long distance service desired, credit card information and the user's PIN, which is provided by activating the dialing device 10. Recharging, if desired, can also be accomplished directly through the original retailer that initially sold the dialing device 10. In such instance, the large card member 72 or the small card member 74 can be again utilized by the retailer for providing the PIN during a recharging process.

Thus, the present invention provides a novel, efficient and accurate means for accessing a prepaid long distance telephone operating service that not only eliminates the need to manually dial the multiple numbers required for placing a call but also can be utilized for activation of the calling means through a point of sale activation procedure. Additionally, the device of the present invention can be utilized for obtaining a recharge for additional long distance telephone service. Although the telephonic access assembly of the present invention has been described with respect to a preferred embodiment, it should be understood that such embodiment may be altered without avoiding the spirit and scope of the present invention. For example, although the carrier means 14 is shown in the form of the card members 72 and 74, the use of such cards is not critical to the invention. Instead, other types of carrier means may be utilized to carry the PIN. For example, the PIN may be encoded on the packaging for the assembly 12, on a sticker attached thereto or even on the dialing device 10.

What is claimed is:

1. A portable electronic long distance telephonic access assembly that includes an automatic dialing device and comprises:
   (a) dialing means for producing upon a single activation a first series of audible tones corresponding to a long distance telephone number and a second series of audible tones corresponding to a personal identification number;
   (b) a housing for enclosing said dialing means;
   (c) means associated with said housing for actuating said dialing means; and
   (d) a data carrier having machine readable data means having data corresponding to said personal identification number for use in activating an account corresponding to said personal identification number with a long distance telephone service provider, said machine readable data means is capable of being read wirelessly.

2. The telephone access assembly as described in claim 1, wherein said dialing means comprises:
(a) computer processing means for controlling the operation of said dialing device;
(b) memory means for storing said long distance telephone number and said personal identification number;
(c) means for generating electronic signals corresponding to said first and second series of tones upon actuation of said dialing device; and
(d) transducer means for receiving signals from said generating means and producing said audible tones.

3. The telephone access assembly as described in claim 2, wherein said generating means produces dual tone modulated frequency signals.

4. The telephone access assembly as described in claim 1, wherein there is an automatic time delay between said first series of tones and said second series of tones.

5. The telephone access assembly as described in claim 1, wherein upon actuation of said dialing means, said first series of tone is produced by said device, and following an automatic time delay said second series of tones is produced automatically.

6. The telephone access assembly as described in claim 1, wherein said housing is of a thin, rectangularly shaped configuration.

7. The telephone access assembly as described in claim 4, wherein said time delay between said first and second series of tones is in the range of approximately two to ten seconds.

8. The telephone access assembly as described in claim 1, wherein said data carrier is a card.

9. The telephone access assembly as described in claim 8, wherein said machine readable data means is a magnetic strip, a upc bar code, or a radio frequency identification device.

10. A method for providing access to a long distance telephonic communication service requiring a point of sale activation via a personal identification number, said method comprising:
(a) providing a portable electronic long distance telephone access assembly having an automatic dialing device and including:
  (1) dialing means for producing upon a single activation a first series of audible tones corresponding to a long distance telephone number and a second series of audible tones corresponding to a personal identification number;
  (2) a housing for enclosing said dialing means;
  (3) means associated with said housing for activating said dialing device; and
  (4) means having machine readable data corresponding to said personal identification number, said means capable of being wirelessly readable;
(b) providing a data terminal reader adapted for point of sale activation for prepaid credit cards; and
(c) wirelessly reading said data with said terminal reader for activation of an account corresponding to the personal identification number of said telephone access assembly.

11. The method of providing access to a communication service as described in claim 10, wherein said account is activated for a specific amount of long distance phone service, which amount can be recharged by the method comprising:
(a) providing a recharging facility having an interactive voice response telephone system;
(b) dialing a long distance telephone number for said recharging facility;
(c) activating said dialing means in response to a prompt from said interactive system to provide said personal identification number to said facility; and
(d) ordering additional long distance service for said account.

12. A portable electronic long distance telephonic access assembly that includes an automatic dialing device and comprises:
(a) dialing means for producing when actuated a first series of audible tones corresponding to a long distance telephone number and a second series of audible tones corresponding to a personal identification number;
(b) a housing for enclosing said dialing means;
(c) means associated with said housing for actuating said dialing means;
(d) machine readable data means having data corresponding to said personal identification number for use in activating an account corresponding to said personal identification number with a long distance telephone service provider; and
(e) said data means is in the form of a carrier that includes a first card with a magnetic stripe and is of a size similar to that of a standard credit card and a second card having a magnetic stripe and is of a size that is smaller than said first card.

13. The telephone access assembly as described in claim 12, wherein said first and second cards each have a UPC code.

14. The telephone access assembly according to claim 12, wherein said housing has front and rear generally planar surfaces and at least one of said surfaces includes means for storing said second card.

15. The telephone access assembly according to claim 14, wherein said card storage means has a generally U-shaped retaining rail formed on one of said planar surfaces and having an upper flange spaced apart from said surface to form a recess for receiving the side edges of said second card.

16. The telephone access assembly as described in claim 15, wherein said machine readable data means is on packaging for said assembly.

17. The telephone access assembly as described in claim 12, wherein said automatic dialing means comprises:
(a) computer processing means for controlling the operation of said dialing device;
(b) memory means for storing said long distance telephone number and said personal identification number;
(c) means for generating electronic signals corresponding to said first and second series of tones upon actuation of said dialing device; and
(d) transducer means for receiving signals from said generating means and producing said audible tones.

* * * * *